United States Patent [19]

Reed

[11] Patent Number: 4,741,940

[45] Date of Patent: May 3, 1988

[54] ARTICLES AND METHODS FOR PROTECTING SUBSTRATES

[75] Inventor: James P. Reed, Redwood City, Calif.

[73] Assignee: Raychem Corporation, Menlo Park, Calif.

[21] Appl. No.: 864,689

[22] Filed: May 19, 1986

[51] Int. Cl.$^4$ .............. B32B 1/04; B32B 3/02; H01B 13/00; H02G 13/02

[52] U.S. Cl. .................... 428/68; 156/48; 156/49; 174/76; 174/84 R; 428/76; 428/255; 428/268; 428/290; 428/304.4; 428/447

[58] Field of Search .............. 428/304.4, 447, 68, 428/76, 255, 268, 290; 156/48, 49, 52, 53, 56; 174/76, 84 R

[56] References Cited

U.S. PATENT DOCUMENTS

| | | | |
|---|---|---|---|
| 3,847,722 | 11/1974 | Kistner | 428/76 |
| 4,366,814 | 1/1983 | Riedel | 128/156 |
| 4,376,438 | 3/1983 | Straube et al. | 128/90 |
| 4,411,262 | 10/1983 | von Bonin et al. | 128/90 |
| 4,442,833 | 4/1984 | Dahlen et al. | 128/90 |
| 4,502,479 | 3/1985 | Garwood et al. | 128/90 |
| 4,519,856 | 5/1985 | Lazzara | 156/49 |
| 4,570,622 | 2/1986 | von Bonin et al. | 128/90 |
| 4,595,635 | 6/1986 | Dubrow | 428/447 |
| 4,609,578 | 9/1986 | Reed | 428/76 |
| 4,610,921 | 9/1986 | Follette | 428/304.4 |
| 4,628,917 | 12/1986 | Campagna, Jr. et al. | 128/90 |
| 4,634,207 | 1/1987 | Debbaut | 174/76 |
| 4,643,924 | 2/1987 | Uken et al. | 428/447 |
| 4,667,661 | 5/1987 | Scholz et al. | 128/90 |

OTHER PUBLICATIONS

McCrory, "Maintenance of Protective Coating Systems on Offshore Platforms", Journal of Protective Coatings & Linings, Apr. 1986, pp. 26–31.

Primary Examiner—William J. Van Balen
Attorney, Agent, or Firm—Herbert G. Burkard

[57] ABSTRACT

This invention provides articles and methods for surface protection which comprises a layer of a gel material having a cone penetration of about 100 to about 350 ($10^{-1}$ mm) and an ultimate elongation of at least 100% and a covering layer of a flexible material which is flexible when installed on the surface to be protected and is hardenable or curable so that after installation the covering layer hardens to hold the gel layer in position and protect the gel layer from mechanical and other environmental conditions. This invention is particularly suitable for providing surface protection for underwater structures by applying the gel layer to displace the water from the surface which is underwater and providing a water curable covering layer which, after being applied to the surface, cures underwater to provide the required mechanical protection for the gel layer.

27 Claims, No Drawings

ARTICLES AND METHODS FOR PROTECTING SUBSTRATES

FIELD OF THE INVENTION

This invention relates to articles and methods for providing environmental protection for substrates utilizing certain gel materials.

BACKGROUND OF THE INVENTION

Various gel materials have been used to protect substrates from corrosion and to provide electrical insulation on certain electrical terminals and connectors to prevent electrical malfunction upon exposure to moisture. These gel materials have particular properties which make them suitable for such uses, including a cone penetration value (ASTM D-937-77) of about 100 to about 350 ($10^{-1}$ mm) and an ultimate elongation value (ASTM D-412) of at least about 100%. These gel materials have been used in various articles which provide means for placing the gel on the substrate and holding the gel in place on the substrate. For example, such gel materials have been used in terminal lug protection caps for the telecommunication industries as shown in U.S. Ser. No. 504,000 filed June 13, 1983, now U.S. Pat. No. 4,634,207; in crimp connectors as shown in U.S. Ser. No. 507,433 filed June 23, 1983, now abandoned; in covers for metal articles as shown in U.S. Ser. No. 715,789 filed Mar. 25, 1985, now abandoned; in thermoformed articles as shown in U.S. Ser. No. 730,699 filed May 2, 1985, now U.S. Pat. No. 4,643,924, in splice case end seals as shown in U.S. Ser. No. 698,643 filed Feb. 6, 1985, now abandoned, and U.S. Ser. No. 730,697 filed May 2, 1985, now U.S. Pat. No. 4,701,574, and in tape forms as shown in U.S. Ser. No. 507,435 filed June 26, 1983, abandoned, U.S. Ser. No. 711,119 filed Mar. 12, 1985, abandoned, U.S. Ser. No. 730,692 filed May 2, 1985, now U.S. Pat. No. 4,595,635, and U.S. Ser. No. 730,405 filed May 2, 1985, now U.S. Pat. No. 4,680,233. The disclosures of the above applications, which are all commonly assigned with this application, are incorporated herein by reference.

The gel materials having the above properties have been applied to substrates by having the gel contained in a preformed shape which is placed on the substrate or having the gel on or in a flexible backing or support which is applied to the substrate as a sheet or tape material. The former requires that the preformed shape have an appropriate shape which corresponds to the substrate on which the gel is to be placed. The sheet or tape articles are suitable for conforming to essentially any shape of substrate but do not provide the mechanical protection for the gel which is desired in some applications and in other applications the gel is not adequately held in place when it is subjected to certain mechanical forces and loads.

It is an objective of the present invention to provide articles and materials as well as methods which enable the utilization of gel materials having the above properties to be effectively applied to substrates having various shapes and provide mechanical and environmental protection for the gel material after it is in place on the substrate.

SUMMARY OF THE INVENTION

In one aspect this invention provides an article for protecting a substrate comprising:

a layer of gel material for contacting the surface of a substrate comprising a gel being cured prior to contacting the substrate and having a cone penetration of about 100 to about 350 ($10^{-1}$ mm) and an ultimate elongation of at least about 100%; and a covering layer of flexible material adapted to carry said layer of gel material and enable placement of the gel material on a substrate and adapted to protect said gel material after the gel is in place on the substrate comprising a material which is flexible during installation on the substrate and hardenable after placed on the substrate to thereby provide mechanical protection for the gel material positioned between the covering layer and the substrate.

In another aspect this invention provides for an assembly comprising:

a substrate;

a layer of gel material in contact with the surface of the substrate comprising a material having a cone penetration of about 100 to about 350 ($10^{-1}$ mm) and an ultimate elongation of at least about 100%; and a layer of protective material over the layer of gel material which is flexible at the time of installation on the substrate and hardens after installation on the substrate to provide mechanical protection for the layer of gel material positioned between the substrate and the layer of protective material.

In another aspect this invention provides a method of protecting a substrate comprising:

placing in contact with the surface of a substrate a gel material having a cone penetration of about 100 to about 350 ($10^{-1}$ mm) and being cured prior to being place in contact with the surface of the substrate; and placing over the gel material a covering material which is flexible at the time of installation thereon and cures or hardens after installation thereby providing mechanical protection for the gel material positioned between the substrate and the covering material.

In another aspect this invention provides for a kit-of-parts comprising:

a sheet or tape of gel material for contacting the surface of a substrate comprising a gel being cured prior to contacting the substrate and having a cone penetration of about 100 to about 350 ($10^{-1}$ mm) and an ultimate elongation of at least about 100%; and a sheet or tape of protective material for covering the gel material after the gel is in place on the substrate comprising a material which is flexible during installation on the substrate and hardenable after placed on the substrate thereby providing mechanical protection for the gel material positioned the protective material and the substrate.

DESCRIPTION OF THE INVENTION

The gel material useful in the present invention include the polyurethane, silicone and other gels described in the patent applications referred to above in the Background section of this specification. Other gels which are particularly useful in the present invention are the silicone gels described in U.S. Ser. No. 730,402 filed May 2, 1985, abandoned and the styrene-dienne block copolymer gels described in U.S. Ser. No. 801,018 filed Nov. 22, 1985, now U.S. Pat. No. 4,716,183, disclosures of which are incorporated herein by reference.

Although the various patent applications referred to describe various compositions useful in the present invention, it is important to note that the type of material or chemical composition of the gel material is in general not as important as the particular physical properties of the gel which make it useful in providing the desired protection for the substrate. The physical properties which are inportant for the gel material are the cone penetration in the range of about 100 to about 350 ($10^{-1}$ mm) and the ultimate elongation of at least 100%. Gels having these properties have sufficient conformability to conform to various shapes and irregularities in the surfaces of various substrates. It is desirable in many uses that the gel also have a relatively high surface tack to form a good seal with the surface of a substrate and have sufficient tensile strength to withstand being applied to and conforming to the shape of a substrate without tearing. The gel material may be made from different chemical compositions than the polyurethanes, polysiloxanes, styrene-dienne block copolymers, and the like as disclosed in the above referenced patent applications, provided that the material has the specified cone penetration and ultimate elongation properties which make the gel material particularly suitable for conforming to and providing environmental protection for a substrate surface.

The gels useful in the present invention provide excellent sealing properties for excluding water and other contaminants from the surface of various substrates. Due to the cone penetration and ultimate elongation properties of the gel materials, they not only conform well to the surface of the substrate to provide the necessary sealing but also have the property of being readily reenterable, i.e. easily removeable, when it is desired to have access to the surface of the substrate. In many applications the same gel material may be reinstalled on the same substrate after it is removed, thus providing the convenience of having the substrate protected but also having it accessible for service, inspection or other purposes. However, it is these properties of conformability and reenterability that limit the gels use in some application because the gel will not withstand the mechanical forces present in some applications. For example if the gel material is subjected to a mechanical load or force the gel material may slide along the surface of the substrate and eventually be displaced from the area where the protection is desired. The preformed articles described in some of the above-referenced patent applications provide one form of mechanical protection for the gel materials but it is not practical to form a preformed shell or cover for every application where the gel material is desired for surface protection of a substrate. The various tapes described in the above-referenced patent applications provide a convenient and useful way of applying a layer of gel material to almost any shape of substrate but the backing materials, if any, on such tapes or strips do not have sufficient mechanical strength to withstand various mechanical loads and forces which are encountered in some applications.

The gels useful in the present invention in general have a cone penetration value from about 100 to about 350 ($10^{-1}$ mm). In many uses it is preferred that the gel have a cone penetration between about 150 and 350 and in some applications it is preferred that the cone penetration be between about 100 and about 300. The gels when used in relatively thin layers with appropriate covering layer may provide superior surface protection and sealing when the cone penetration is between about 250 and about 350. The ultimate elongation of the gel material should be at least 100% in order to provide good conformability with the surface of the substrate. Higher values are generally preferred in order to provide better sealing of the gel material to the surface of the substrate. It is generally preferred that the gel material have an elongation of at least 200% and in many applications an elongation of at least 500% is desired. In other applications it is preferred that the gel material have an elongation of at least 750%.

The covering layer of the present invention may likewise be made of any desired material which provides the properties of being flexible at the time of installation on the substrate and curable or hardenable after the covering layer is installed on the substrate. In the method and assembly aspects of the present invention, it should be noted that the gel layer may be applied to the substrate separately. Then the covering layer may be applied over the gel to hold the gel in place and provide mechanical protection for the gel. It is important to note that it is not necessary for the covering layer to be in direct contact with the gel layer provided that any intervening layers or materials do not interfere with the function of the covering layer holding the gel in position and providing mechanical protection for the gel layer. In the article aspect of the present invention, the layer of gel material will usually be in direct contact with the covering layer although there may be intervening layers or compositions between the gel layer and the covering layer provided that the function of the cover layer of providing mechanical protection for the gel material after it is in place on the surface of the substrate is not interfered with.

The primary function of the covering layer is to provide mechanical and environmental protection for the gel material when the gel material is in place on the surface of a substrate. The covering layer can also provide the compression or pressure forces which hold the gel material in conforming contact with the surface of the substrate. However, such compression or pressure may be supplied from other means such as an elastic tape which is wrapped around the gel layer on the substrate then the covering layer applied over the gel layer and the tape. The covering layer may be applied only to cover the gel material or may be overlapped to cover not only the gel material but to also contact and cover a portion of the substrate.

The covering or protective layer useful in the present invention may be woven or non-woven fabrics, polymeric materials and the like which are in the form of sheets or strips. They must be sufficiently flexible to be applied to the desired substrate either with the gel attached to or carried by the covering layer or as a separate layer where the gel is separately applied to the substrate. The covering or protective layer will cure or harden after being applied to the substrate to provide mechanical and environmental protection for the gel on the substrate. Thus the covering layer may be a curable material such as a water curable material which is flexible in its uncured state and becomes rigid or hard after installation on the substrate and exposed to water or moisture. The covering layer may be a material which hardens upon drying such as by the evaporation of water or the loss of some other solvent or component in the material. The covering layer may be thermoplastic wherein the material is heated or warmed to make it flexible for installation on the substrate and returns to a hard or rigid state upon cooling after application to the substrate. The covering material may be a chemically catalyzed system which is applied to the substrate and then activated with a catalyst or activator which causes the material to cure in place and harden after it is installed on the substrate.

The covering layer should cure or harden within a reasonable amount of time after installation to protect the gel layer. The time will depend on the installation, the amount of time required for installing the covering layer, the environmental conditions and other factors. The curing or hardening time can be adjusted as required.

The articles according to the present invention may be in the firm of tapes, sheets or other shapes suitable for application on the intended substrate. For example, the tape form in various widths is particularly useful in wrapping pipes, poles, structural members and cross bracing in various structures such as scaffolding, power line towers, offshore drilling platforms and the like wherein the structural members or cross bracking may be tubular, flat or angled construction. In such applications the tape form of the articles of the present invention is wrapped around the substrate desired to be protected. Because the tape is flexible and can be conformed to any shape of the substate and even pressed into and conformed to inside corners of angular members, the layer of gel material in the article can be placed in intimate contact with the various shapes of the surface of the substrate. The gel material will generally have sufficient surface tackiness to aid in the installarion of the tape on the substrate, i.e., the surface tackiness of the gel temporarily holds the gel in contact with the substrate while the covering layer of the article cures or hardens. If desired an external compression means may be used to apply pressure to the gel layer and the covering layer until the covering layer cures or hardens, then the external compression means can be removed. After the covering layer of the article has cured or hardened, the gel layer is held in place and cannot be removed from the substrate without breaking, cutting or otherwise removing the covering layer.

The articles of this invention are particularly useful in sheet form for use on large substrates which are flat or have irregular shaped surfaces. For example an article according to the present invention can be made in a sheet form and cut to fit an irregular shaped substrate such as the inside surface of a metal automobile door or fender. When the sheet is placed on such a substrate it will conform to all of the shapes of the substrate and the gel layer can be pressed onto the surface of the substrate to provide good contact with and sealing of the substrate. When the covering layer cures and/or hardens the gel layer will be protected from being scraped or pulled off in small pieces. After the covering layer has cured and conforms to the shape of the substrate, the surface tackiness of the gel material can easily hold the article in position since it cannot be pealed off or removed in small pieces, without cutting or breaking the covering layer. The article is, however, still removeabie if it is desired to reenter the substrate and have access to the surface thereof by simply breaking or cutting the covering layer so that the article can be removed in smaller pieces or by pulling the entire article off the substrate in one piece, if sufficient force can be applied. As mentioned above, the gel material performs well in this regard in that it is removeable cleanly from the surface of the substrate.

DESCRIPTION OF PREFERRED EMBODIMENTS

In a preferred aspect of the present invention, a gel tape or strip such as defined in U.S. Ser. No. 507,435 filed June 23, 1983 is used in combination with water curable fiberglass tapes such as those available in the medical industry for forming casts for broken bones. It is generally preferred to use the polysiloxane gels since they are more immune to environmental degradation than some other systems.

One use of particular interest for the present invention is in the area of corrosion protection and prevention in offshore platforms where salt water corrosion is a particular problem, especially in the splash zone or tidal zone of such flatform structures. Various coatings have been used to provide corrosion prevention and protection for such structures. For example see McCrory, *Journal of Protective Coatings and Linings*, April 1986, pages 26-31. The coatings of various kinds provide various degress of protection but have certain disadvantages of surface preparation requirements and other conditions under which they can be applied. The present invention provides the means to cover and protect such surfaces with the gel materials of the present invention without as much surface preparation as required for conventional coatings.

The gel materials of this application can be applied to wet surfaces and even underwater since they will displace all or essentially all of the water when applied under tension. This displacement of the water is believed to be due to the gel material conforming to and essentially wetting the surface of the substrate with the gel itself. While the gel materials of this invention provide excellent surface protection, they do not have the mechanical strength required to endure the mechanical loads and physical conditions to which they would be subjected on a offshore platform environment. The present invention provides as part of the novel combination hereof a means of protecting the gel material and holding the gel material in place so the gel can continue to maintain the surface protection desired.

The preferred covering layer according to the present invention for many applications are the water curable fiberglass tape materials which are fiberglass mesh tapes impregnated with a high loading of water curable resins. These tapes can be applied to a wet surface or even under water and after a short period of time cure to form a hard covering layer which is essentially equivalent to a fiberglass reenforced cured resin layer which is extremely tough to mechanical abrasion and is strong enough to withstand various mechanical loads. When applied over the gel layer under tension the water curable fiberglass tape can provide compression forces on the gel layer which compression forces can be maintained to some degree over long periods of time after the fiberglass tape has cured. Such compression forces enhance the performance of the gel layer in providing the surface protection through more complete contact of the gel with the surface of the substrate.

In another preferred aspect of this invention, the gel layer such as a gel tape which is tacky on both surfaces can be first applied to the water curable fiberglass tape. Alternatively, the uncured, liquid gel material can be cast on the fiberglass tape and cured in place to form the gel layer on the fiberglass tape. Such articles according to the present invention can then be applied in a single step to a desired substrate whether it is a flat substrate such as a storage tank, automobile door and the like, or a substrare which the gel-water curable fiberglass tape can be wrapped around in a single step. In either type of application when the water curable fiberglass tape cures and hardens, it holds the gel in place and protects the gel from mechanical abrasion and loads.

The gel material used in the present invention may contain appropriate corrosion inhibitors, fillers, additives, and the like depending on the desired end use application. When the gel layer and the covering layer are applied separately, the gel layer can also contain a catalyst or accelerator to cause or aid in the cure of the covering layer.

The following example provides an illustration of the present invention.

EXAMPLE

Carbon steel bars 0.5 inch in diameter were submersed in a tank containing a 3% NaCl solution. A polysiloxane gel tape, available under the designation "GelTek 1000" from Raychem Corporation, Menlo Park, California, having a cone penetration of about 250 ($10^{-1}$ mm) and an elongation greater than 500% was applied a number of the steel bars by spiral wrapping the tape underwater around each bar with 25% overlap and applying sufficient tension in the wrapping process to displace the water and cause the gel to make good contact with the metal surface. The tape was about 0.040 inch thick and 1 inch wide. A number of the steel bars were retained as bare unwrapped control samples. A water curable fiberglass casting tape, available from Cutter Biomedical under the designation "MaxCast Tape No. 202-52," was applied underwater in a spiral wrap over the polysiloxane gel tape using a 50% overlap. Sufficient tension was applied to induce good contact such that the polysiloxane gel tape was placed in compression against the metal substrate. Tie wraps were used to hold the fiberglass tape in place. The samples remained underwater while the resin in the fiberglass tape cured; cure time was approximately 20 minutes. After the samples were fully cured they were removed from the tank and mechanically impacted with a hand-held 16 oz. hammer for 100 cycles and then replaced in the 3% NaCl solution for 14 days. At the conclusion of the test, the samples were removed from the tank and inspected. The fiberglass jacket remained tough and abrasion resistant. The fiberglass and gel layers were then removed from the samples. About 10% of the metal surface showed some degree of corrosion and 90% of the metal surface was corrosion free. In those areas that showed some corrosion the degree of corrosion was slight compared to the corrosion shown on the bare steel bar control samples.

I claim:
1. An article for protecting a substrate comprising:
   a layer of gel material for contacting the surface of a substrate comprising a gel being cured prior to contacting the substrate and having a cone penetration of about 100 to about 350 ($10^{-1}$ mm) and an ultimate elongation of at least about 100%; and
   a covering layer of flexible material adapted to carry said layer of gel material and enable placement of the gel material on a substrate and adapted to protect said gel material after the gel is in place on the substrate comprising a material which is flexible during installation on the substrate and hardenable after placed on the substrate to thereby provide mechanical protection for the gel material positioned between the covering layer and the substrate.

2. An article according to claim 1 wherein the gel material has a cone penetration between about 150 and 350 and an ultimate elongation of at least about 200%.

3. An article according to claim 1 wherein the covering layer is a fabric impregnated with a resin.

4. An article according to claim 2 wherein the covering layer is a fabric impregnated with a resin.

5. An article according to claim 3 wherein the covering layer is water curable.

6. An article according to claim 4 wherein the covering layer is water curable.

7. An article according to claim 6 wherein the fabric is a fiberglass material.

8. An assembly comprising:
   a substrate;
   a layer of gel material in contact with the surface of the substrate comprising a material having a cone pentration of about 100 to about 350 ($10^{-1}$ mm) and an ultimate elongation of at least about 100%; and
   a layer of protective material over the layer of gel material which is flexible at the time of installation on the substrate and hardens after installation on the substrate to provide mechanical protection for the layer of gel material positioned between the substrate and the layer of protective material.

9. An assembly according to claim 8 wherein the gel material has a cone penetration between about 150 and 350 and an ultimate elongation of at least about 200%.

10. An assembly according to claim 8 wherein the covering layer is a fabric impregnated with a resin.

11. An assembly according to claim 9 wherein the covering layer is a fabric impregnated with a resin.

12. An assembly according to claim 10 wherein the covering layer is water curable.

13. An assembly according to claim 11 wherein the covering layer is water curable.

14. An assembly according to claim 13 wherein the fabric is a fiberglass material.

15. A method of protecting a substrate comprising:
    placing in contact with the surface of a substrate a gel material having a cone penetration of about 100 to about 350 ($10^{-1}$ mm) and being cured prior to being place in contact with the surface of the substrate; and
    placing over the gel material a covering material which is flexible at the time of installation thereon and cures or hardens after installation thereby providing mechanical protection for the gel material positioned between the substrate and the covering material.

16. A method according to claim 15 wherein the gel material has a cone penetration between about 150 and 350 and an ultimate elongation of at least about 200%.

17. A method according to claim 15 wherein the covering layer is a fabric impregnated with a resin.

18. A method according to claim 16 wherein the covering layer is a fabric impregnated with a resin.

19. A method according to claim 17 wherein the covering layer is water curable.

20. A method according to claim 18 wherein the covering layer is water curable.

21. A method according to claim 20 wherein the fabric is a fiberglass material.

22. A kit-of-parts comprising:

a sheet or tape of gel material for contacting the surface of a substrate comprising a gel being cured prior to contacting the substrate and having a cone penetration of about 100 to about 350 ($10^{-1}$ mm) and an ultimate elongation of at least about 100%; and a sheet or tape of protective material for covering the gel material after the gel is in place on the substrate comprising a material which is flexible during installation on the substrate and hardenable after placed on the substrate thereby providing mechanical protection for the gel material positioned the protective material and the substrate.

23. A kit-of-parts according to claim 22 wherein the gel material has a cone penetration between about 150 and 350 and an ultimate elongation of at least about 200%.

24. A kit-of-parts according to claim 22 wherein the covering layer is a fabric impregnated with a resin.

25. A kit-of-parts according to claim 23 wherein the covering layer is a fabric impregnated with a resin.

26. A kit-of-parts according to claim 24 wherein the covering layer is water curable.

27. A kit-of-parts according to claim 26 wherein the covering layer is water curable.

* * * * *